Sept. 7, 1954    R. A. BARBERA    2,688,479
VIBRATION AND SHOCK MOUNT
Filed Aug. 10, 1953    2 Sheets-Sheet 1

INVENTOR.
ROBERT A. BARBERA
BY
Kenyon & Kenyon
ATTORNEYS

Sept. 7, 1954  R. A. BARBERA  2,688,479
VIBRATION AND SHOCK MOUNT
Filed Aug. 10, 1953  2 Sheets-Sheet 2

INVENTOR.
ROBERT A. BARBERA
BY
Kenyon & Kenyon
ATTORNEYS

Patented Sept. 7, 1954

2,688,479

UNITED STATES PATENT OFFICE 2,688,479

VIBRATION AND SHOCK MOUNT

Robert A. Barbera, Brooklyn, N. Y.

Application August 10, 1953, Serial No. 373,241

18 Claims. (Cl. 267—1)

This application is a continuation in part of my application Serial No. 305,727, filed August 22, 1952, for Vibration and Shock Mount and now abandoned.

This invention relates to vibration and shock absorbing mounts and particularly to such mounts which provide vibration dampening, shock absorption and coulomb dampening in all three axes and rotation on these axes.

One of the objects of the invention is to provide such a mount in which properly designed vibration dampening elements are combined with properly designed shock absorbing elements so as to give a unitary mount which has highly desirable vibration dampening properties combined with equally desirable shock absorbing qualities.

Another object of the invention is to provide such a mount in which metallic springs of high resiliency relative to the resiliency of the shock absorbing elements are combined with shock absorbing elements of relatively low resiliency compared to the vibration dampening elements to operate first to dampen vibrations and consequently on shock to absorb shock.

Another object of the invention is to provide such a mount which is simple in construction and in which proper engineering design may be easily incorporated.

Another object of the invention is to provide such a shock mount which is inexpensive.

For the purpose of illustrating the invention, there is shown in the accompanying drawings a form thereof which is at present preferred since it gives satisfactory and reliable results, although it is to be understood that the various elements of which the invention consists can be otherwise arranged and organized and that the invention is not limited to the specific arrangement and organization of the instrumentalities here shown and described.

Figure 1:
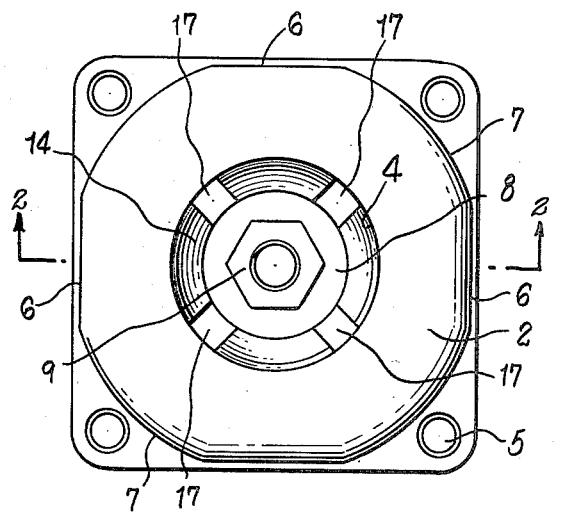
Fig. 1 is a general plan view of the vibration and shock mount.

The mount consists of a metal casing consisting of a flat base 1, an opposed top 2 and side walls 3 extending therebetween. The top wall is provided with an aperture 4, which is centrally disposed. The base may be provided with holes 5 to receive attaching members such as screws or bolts.

In the preferred form of the invention as shown the side walls 3 have alternating flat sections 6 and arcuate sections 7 adjoining one another. They are perpendicular to the base. The curvature of the arcuate section 7 is described by the radius having its fixed end at the center line of the mount.

Within the casing is a generally disc-shaped plate 8, which has a mounting stud 9 extending vertically therefrom. This stud may serve to affix various loads to the mount. It is tapped and threaded therefor.

A plurality of leaf springs 10 extend laterally from the plate 8. These springs are preferably metallic and are of high resiliency relative to the resiliency of the shock absorbing member which will be described later. Each of these springs slidably engages the side wall and each is under compression or is preloaded by an amount approximate to the weight of the design load intended to be applied to the mounting. Each of these springs engages one of the flat sections 6 and is narrower than the width of said flat section. These springs serve to absorb lateral vibration and have some dampening effect in their up-and-down sliding movement on the walls when the plate 8 moves up and down.

The plate 8 is supported by a compression coil spring 11, which is of high resiliency relative to the shock absorbing member. This spring is of such dimension that when loaded with the application of the design weight load it is partially compressed thereby and permits the plate 8 to take up a position in the casing practically equidistant between the base and the top wall.

The spring 11 engages the central bottom portion of the plate 8, where a stud 12 is provided. It is disposed for lateral sliding movement on the base and is provided for that purpose with a slide 13, which is of a material having frictional dampening properties. A plastic material sold under the trade name "Synthane" is satisfactory. Material sold under the trade-mark "Bakelite" is also satisfactory.

The shock absorbing means consist of a bumper 14, which is of resilient material such as rubber having a resiliency relatively less than the resiliency of the vibration dampening means. This bumper extends beyond, above and below the periphery of the plate 8 to take up shock by contact with the walls of the casing. The bumper is slotted as indicated at 15 adjacent each of the springs 10 to receive said springs on compression thereof so that the bumper may engage the walls of the casing.

The bumper is also provided with a central recess 16 to receive the spring 11 when it is compressed so that the bumper may on downward motion of the plate absorb shock by striking against the slide 13 and in effect thus against the base 1. The upper portion of the bumper is disposed to engage the upper wall on upward movement of the plate.

The bumper is also slotted as indicated at 17 to provide room for compression of the bumper when it strikes against the wall.

The bumper is made of a material of low resilience, such as rubber. The durometer hardness of the rubber varies with the load range and is adjusted thereto. The bumper is positioned in the casing so that a line extending radially of the bumper and bisecting the center of any of slots 17 also bisects an arcuate wall section 7. A line extending radially of the bumper and bisecting one of the slots 15 will bisect one of the flat wall sections 6.

This bumper is generally cylindrical in form and has a radius less than the radius of the arcuate portions of the casing so that on contact between the bumper and the casing an increased bearing area of the bumper will become available and the bumper will become stiffer as the load is increased.

With this arrangement of the parts, the four leaf springs 10 and the coil spring 11 are effective to dampen vibration in all three axes. Furthermore, the sliding engagement between the springs and the walls provides coulomb or frictional dampening in all three axes and rotation on these axes so that the vibration of any spring is dampened by the action of one part or another of the combination.

Figure 2:
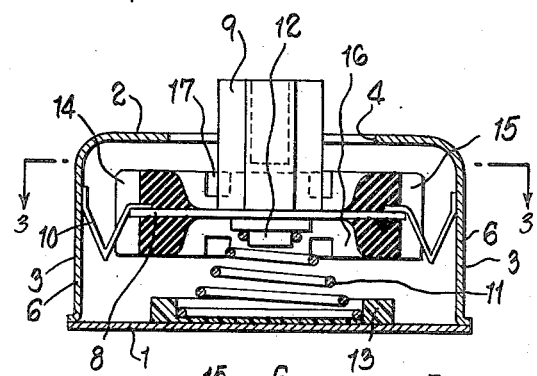
Fig. 2 is a section taken along the line 2—2 of Fig. 1.
Figure 3:
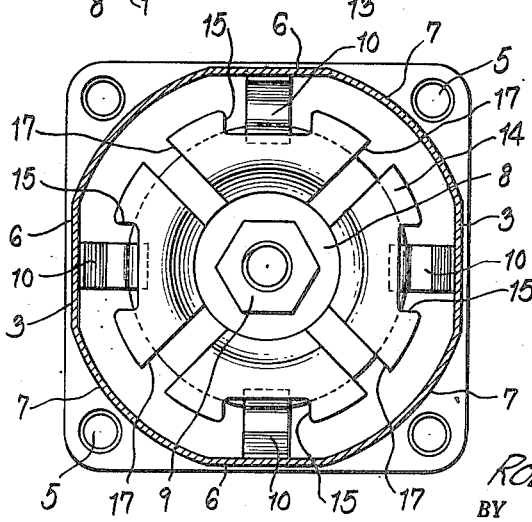
Fig. 3 is a section taken along the line 3—3 of Fig. 2.
Figure 4:
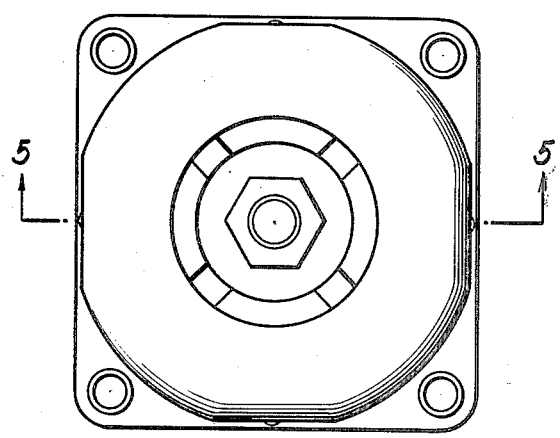
Fig. 4 is a general plan view of another form of the invention.
Figure 5:
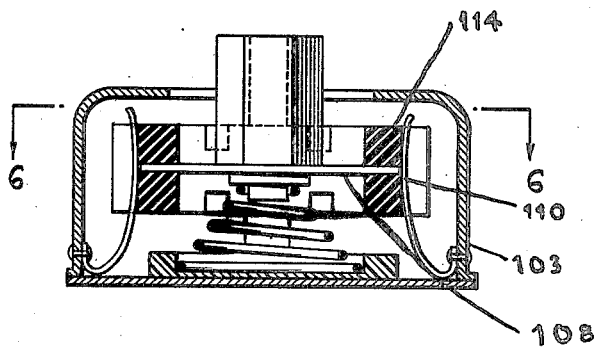
Fig. 5 is a section taken along the line 5—5 of Fig. 4.
Figure 6:
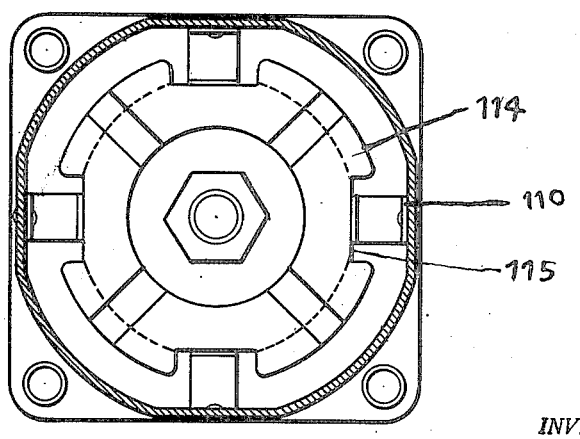
Fig. 6 is a section taken along the line 6—6 of Fig. 5.

In the form of invention shown in Figs. 4-6, the parts are generally similar to those shown in Figs. 1-3.

The plate 108, which corresponds to the plate 8, of the above-mentioned form of invention is molded in a bumper 114 of resilient material such as the rubber forming the bumper 14 in the above-mentioned form of the invention. The bumper extends beyond, above and below the periphery of the plate to take up shock by contact with the walls of the casing in the same way as the bumper 14 does in the above-mentioned form of the invention. The bumper is slotted at 115 to receive springs 110 which correspond generally in function to the springs 10 above described when said springs 110 are compressed. On compression of these springs this permits the bumper to engage the walls of the casing.

The springs 110, which correspond to the leaf springs 10 of the form of invention shown in Figs. 1-3, are preferably metallic and of high resiliency relative to the resiliency of the shock-absorbing member 114. The springs 110 are anchored to the side walls 103 of the metal casing. They bear against the rubber bumper 114, as shown, in the slots 115. These springs serve to absorb lateral vibration and have highly desirable dampening effect during the up-and-down sliding movement of the plate 108 and the bumper 114 because they bear on the rubber of the bumper 114, although when the rubber is slightly worn down, they may bear also against the plate 108.

This form of construction is easy to make since the springs 110 may be easily anchored in the casing without having them molded into the rubber, since even when the rubber is worn down until the spring contacts the plate 108 they still bear on the rubber of the bumper 114. They have desirable dampening characteristics on the up-and-down movement of the plate 108 and the bumper 114.

Otherwise the parts coact in the same way as the corresponding parts do in the form of the invention shown in Figs. 1-3.

In addition the bumper having its particular form is effective to absorb shock in all three axes. This is done on compression of the vibration controlling springs which are of greater resiliency.

The present invention may be embodied in other specific forms without departing from the spirit or essential attributes thereof and it is therefore desired that the present embodiment be considered in all respects as illustrative and not restrictive, reference being had to the claims rather than to the foregoing description to indicate the scope of the invention.

I claim:

1. A shock and vibration mounting comprising a casing having a base, side walls and a top wall having an aperture for a supporting post, a plate for receiving the supporting post disposed in said casing parallel to said base, means for absorbing vibration comprising a plurality of leaf springs of relatively high resiliency extending laterally from said plate and slidably bearing against the side walls of the casing, a slide disposed for lateral sliding movement on said base, and means for supporting said plate and absorbing vibration comprising a compression coil spring of relatively high resiliency disposed between said slide and said plate and supporting said plate above said base and slide, and a resilient shock-absorbing bumper of rubber of relatively low resiliency disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

2. A shock and vibration mounting comprising a casing having a base, side walls and a top wall, a plate disposed in said casing parallel to said base, means for absorbing vibration comprising a plurality of leaf springs of relatively high resiliency extending laterally from said plate and slidably bearing against the side walls of the casing, a slide disposed for lateral sliding movement on said base, and means for supporting said plate and absorbing vibration comprising a compression coil spring of relatively high resiliency disposed between said slide and said plate and supporting said plate above said base and slide, and a resilient shock-absorbing bumper of rubber of relatively low resiliency disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

3. A shock and vibration mounting comprising a casing having a base, side walls and a top wall having an aperture for a supporting post, a plate for receiving the supporting post disposed in said casing parallel to said base, means for absorbing vibration comprising a plurality of leaf springs extending laterally from said plate and slidably bearing against the side walls of the casing, a slide disposed for lateral sliding movement on said base, and means for supporting said plate and absorbing vibration comprising a compression spring disposed between said slide and said plate and supporting said plate above said base and slide, and a resilient shock-absorbing bumper of rubber disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

4. A shock and vibration mounting comprising a casing having a base, side walls and a top wall, a plate disposed in said casing parallel to said base, means for absorbing vibration comprising a plurality of leaf springs extending laterally from said plate and slidably bearing against the side walls of the casing, a slide disposed for lateral sliding movement on said base, and means for supporting said plate and absorbing vibration comprising a compression spring disposed between said slide and said plate and supporting said plate above said base and slide, and a resilient shock-absorbing bumper of rubber disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

5. A shock and vibration mounting comprising a casing having a base, side walls and a top wall, having an aperture for a supporting post, a plate for receiving the supporting post disposed in said casing parallel to said base, means for absorbing vibration comprising a plurality of leaf springs extending laterally from said plate and slidably bearing against the side walls of the casing, a slide disposed for lateral sliding movement on said base, and means for supporting said plate and absorbing vibration comprising a compression spring disposed between said slide and said plate and supporting said plate above said base and slide, and a resilient shock-absorbing bumper disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

6. A shock and vibration mounting comprising a casing having a base, side walls and a top wall, a plate disposed in said casing parallel to said base, means for absorbing vibration comprising a plurality of leaf springs extending laterally from said plate and slidably bearing against the side walls of the casing, a slide disposed for lateral sliding movement on said base, and means for supporting said plate and absorbing vibration comprising a compression spring disposed between said slide and said plate and supporting said plate above said base and slide, and a resilient shock-absorbing bumper disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

7. A shock and vibration mounting comprising a casing having a base, side walls and a top wall having an aperture for a supporting post, a plate for receiving the supporting post disposed in said casing parallel to said base, means for absorbing vibration comprising a plurality of leaf springs extending laterally from said plate and slidably bearing against the side walls of the casing, and means for supporting said plate and absorbing vibration comprising a compression spring disposed between said base and said plate and supporting said plate above said base and slidable laterally of said base, and a resilient shock-absorbing bumper disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

8. A shock and vibration mounting comprising a casing having a base, side walls and a top wall, a plate disposed in said casing parallel to said base, means for absorbing vibration comprising a plurality of leaf springs extending laterally from said plate and slidably bearing against the side walls of the casing, and means for supporting said plate and absorbing vibration comprising a compression spring disposed between said base and said plate and supporting said plate above said base and slidable laterally of said base, and a resilient shock-absorbing bumper disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

9. A shock and vibration mounting comprising a casing having a base, side walls and a top wall, a plate disposed in said casing parallel to said base, means of relatively high resiliency for absorbing lateral vibration extending laterally from said plate and slidably bearing against the side walls of the casing, and means of relatively high resiliency for supporting said plate and absorbing vertical vibration disposed laterally slidably on said base between said slide and said base and supporting said plate above said base, and a resilient shock-absorbing bumper of relatively low resiliency disposed at and extending beyond, above and below the periphery of said plate to engage said side walls to absorb shock, said bumper being slotted adjacent said means for absorbing lateral vibration to receive said means on compression thereof whereby said bumper may engage said walls to absorb shock, said bumper also having a central lower recess to receive said means for absorbing vertical vibration on compression thereof whereby said bumper may absorb shock on downward movement of said plate toward said base, the upwardly-extending portions of said bumper being positioned to engage said top wall to absorb shock on upward movement of said plate.

10. A shock and vibration mounting comprising a casing having a base and a top wall and generally cylindrical side walls having alternating flat and arcuate adjoining sections, a generally disc-shaped plate disposed in said casing parallel to said base, means for absorbing vibration comprising a plurality of leaf springs of relatively high resiliency and narrower than said flat wall sections extending laterally from said plate and slidably bearing against said flat sections of said side walls, and means for supporting said plate and absorbing vibration comprising a compression spring of relatively high resiliency disposed between said base and said plate and supporting said plate above said base and slidable laterally of said base, a generally cylindrical bumper of resilient shock-absorbing material of relatively low resiliency disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof, whereby said bumper may absorb shock on downward movement of said plate toward said base, the upwardly-extending portions of the bumper being positioned to engage said top wall to absorb shock on upward movement of said plate.

11. A shock and vibration mounting comprising a casing having a base and a top wall and generally cylindrical side walls having alternating flat and arcuate adjoining sections, a generally disc-shaped plate disposed in said casing parallel to said base, means for absorbing vibration comprising a plurality of leaf springs extending laterally from said plate and slidably bearing against said flat sections of said side walls, and means for supporting said plate and absorbing vibration comprising a compression spring disposed between said base and said plate and supporting said plate above said base and slidable laterally of said base, a generally cylindrical bumper of resilient shock-absorbing material disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof, whereby said bumper may absorb shock on downward movement of said plate toward said base, the upwardly-extending portions of the bumper being positioned to engage said top wall to absorb shock on upward movement of said plate.

12. A shock and vibration mounting comprising a casing having a base and a top wall and generally cylindrical side walls having alternating flat and arcuate adjoining sections, a generally disc-shaped plate disposed in said casing parallel to said base, means for absorbing vibration comprising a plurality of leaf springs of relatively high resiliency and narrower than said flat wall sections extending laterally from said plate and slidably bearing against said flat sections of said side walls and means for supporting said plate and absorbing vibration comprising a compression spring of relatively high resiliency disposed between said base and said plate and supporting said plate above said base and slidable laterally of said base, a generally cylindrical bumper of resilient shock-absorbing material of relatively low resiliency disposed at and extending beyond, above and below the periphery of said plate to engage said walls to absorb shock, said bumper having a radius less than the radius of the arcuate sections of the side walls and being slotted adjacent said leaf springs to receive said leaf springs on compression thereof whereby said bumper may engage said side walls to absorb shock, said bumper also having a central lower recess to receive said supporting spring on compression thereof, whereby said bumper may absorb shock on downward movement of said plate toward said base, the upwardly-extending portions of the bumper being positioned to engage said top wall to absorb shock on upward movement of said plate.

13. A shock and vibration mounting comprising a casing having a base and a top wall and generally cylindrical side walls having alternating flat and arcuate adjoining sections, a generally disc-shaped plate disposed in said casing parallel to said base, means for absorbing vibration comprising a plurality of leaf springs extending laterally from said plate and slidably bearing against said flat sections of said side walls and means for supporting said plate and absorbing vibration comprising a compression spring disposed between said base and said plate and supporting said plate above said base and slidable laterally of said base, a generally cylindrical bumper of resilient shock-absorbing material disposed at and extending beyond, above and below the periphery of said plate to engage said walls to absorb shock, said bumper having a radius less than the radius of the arcuate sections of the side walls and being slotted adjacent said leaf springs to receive said leaf springs on compression thereof whereby said bumper may engage said side walls to absorb shock, said bumper also having a central lower recess to receive said supporting spring on compression thereof, whereby said bumper may absorb shock on downward movement of said plate toward said base, the upwardly-extending portions of the bumper being positioned to engage said top wall to absorb shock on upward movement of said plate.

14. A shock and vibration mounting comprising a casing having a base, side walls and a top wall having an aperture for a supporting post, a plate for receiving the supporting post disposed in said casing parallel to said base, a resilient shock-absorbing bumper of rubber of relatively low resiliency disposed at and extending beyond, above and below the periphery of said plate to engage said walls to absorb shock, means for absorbing vibration comprising a plurality of leaf springs of relatively high resiliency secured to the side walls of said casing and extending laterally of said plate, a slide disposed for lateral sliding movement on said base, and means for supporting said plate and absorbing vibration comprising a compression coil spring of relatively high resiliency disposed between said slide and said plate and supporting said plate above said base and slide, said bumper having vertically extending slots adjacent said leaf springs to receive said leaf springs on compression thereof whereby said bumper may engage said side walls to absorb shock, said leaf springs bearing slidably against the bottoms of said slots, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

15. A shock and vibration mounting comprising a casing having a base, side walls and a top wall, a plate disposed in said casing parallel to said base, a resilient shock-absorbing bumper of rubber disposed at and extending beyond, above and below the periphery of said plate to engage said walls to absorb shock, means for absorbing vibration comprising a plurality of leaf springs secured to the side walls of said casing and extending laterally of said plate, a slide disposed for lateral sliding movement on said base, and means for supporting said plate and absorbing vibration comprising a compression spring disposed between said slide and said plate and supporting said plate above said base and slide, said bumper having vertically extending slots adjacent said leaf springs to receive said leaf springs on compression thereof whereby said bumper may engage said side walls to absorb shock, said leaf springs bearing slidably against the bottoms of said slots, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

16. A shock and vibration mounting comprising a casing having a base, side walls and a top wall, a plate disposed in said casing parallel to said base, a resilient shock-absorbing bumper disposed at and extending beyond, above and below the periphery of said plate to engage said walls to absorb shock, means for absorbing vibration comprising a plurality of leaf springs secured to the side walls of said casing and extending laterally of said plate, and means for supporting said plate and absorbing vibration comprising a compression spring disposed between said base and said plate and supporting said plate above said base and slidable laterally of said base, said bumper having vertically extending slots adjacent said leaf springs to receive said leaf springs on compression thereof whereby said bumper may engage said side walls to absorb shock, said leaf springs bearing slidably against the bottoms of said slots, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

17. A shock and vibration mounting comprising a stationary member comprising a casing having a base, side walls and a top wall, a movable member mounted for vertical and horizontal movement comprising a plate disposed in said casing parallel to said base, means for absorbing vibration comprising a plurality of leaf springs extending laterally from one of said members to the other and slidably engaging said other member, and means for supporting said plate and absorbing vibration comprising a compression spring disposed between said base and said plate and supporting said plate above said base and slidable laterally of said base, and a resilient shock-absorbing bumper disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

18. A shock and vibration mounting comprising a stationary member comprising a casing having a base, side walls and a top wall, a movable member mounted for vertical and horizontal movement comprising a plate disposed in said casing parallel to said base, means for absorbing vibration comprising a plurality of leaf springs extending laterally from one of said members to the other and slidably engaging said other member, and means for supporting said plate and absorbing vibration comprising a compression spring disposed between said base and said plate and supporting said plate above said base, and a resilient shock-absorbing bumper disposed at and extending beyond, above and below the periphery of said plate to engage said walls to absorb shock, said bumper being slotted adjacent said leaf springs to receive said leaf springs on compression thereof whereby said bumper may engage said side walls to absorb shock, said bumper also having a central lower recess to receive said supporting spring on compression thereof whereby said bumper may absorb shock on downward movement of said plate toward said base, the upwardly-extending portions of said bumper being positioned to engage said top wall to absorb shock on upward movement of said plate.

References Cited in the file of this patent

UNITED STATES PATENTS

| Number | Name | Date |
|---|---|---|
| 2,175,405 | Meredith et al. | Oct. 10, 1939 |
| 2,379,488 | Koch et al. | July 3, 1945 |
| 2,425,565 | Robinson | Aug. 12, 1947 |
| 2,610,017 | Lambert et al. | Sept. 9, 1952 |